Dec. 22, 1959 G. W. FYLER ET AL 2,918,602

FOCUSING AND SCANNING SYSTEM

Filed Jan. 27, 1958

2,918,602
Patented Dec. 22, 1959

2,918,602

FOCUSING AND SCANNING SYSTEM

George W. Fyler, Lombard, and Grigory Strachanow, Chicago, Ill., assignors to Zenith Radio Corporation, a corporation of Delaware Application January 27, 1958, Serial No. 711,420

7 Claims. (Cl. 315—22)

Figures 1, 2, 3:
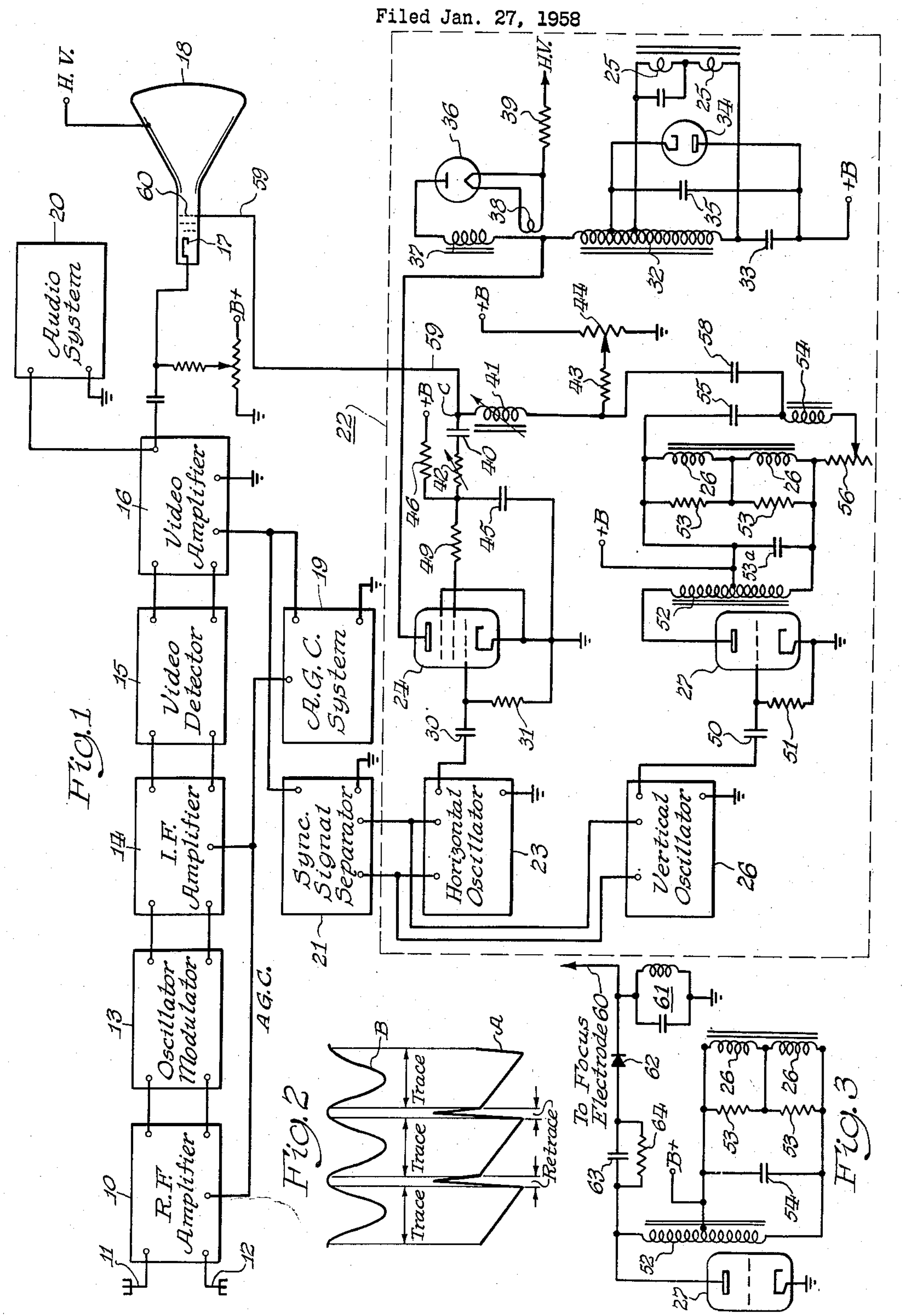

This invention relates to a focusing and scanning system for a cathode-ray type television apparatus and is concerned particularly with maintaining constant focus as the beam of an electrostatically focused cathode-ray tube is deflected over a scanning raster.

The need for focus control is certainly well understood in the art. It was experienced early in television apparatus as an incident to the scanning of cathode-ray tubes because the distance from the center of deflection to the scanned raster is not uniform. Actually, that distance varies markedly as the beam is deflected horizontally and vertically from the central portion of the screen and, consequently, defocusing is most severe at the corners of the raster. The adoption of picture tubes of increased size and wider deflection angles in recent years has emphasized the defocusing effect at the corners of the scanning pattern and the recent introduction of 110° tube further accentuates the need for focus control.

Efforts have been made heretofore to control focus in electrostatically focused tubes by changing the magnitude of the focus potential with displacement of the beam from the center of the raster. This technique is referred to as "dynamic focusing." It comprises the application of a unidirectional potential to the focus electrode of the electrostatically focused cathode-ray tube to establish the proper focus condition at the center of the raster and the concurrent application of a suitably varying potential to preserve that condition throughout the scanning raster. Since, in the usual case, the beam focus changes approximately in accordance with a parabolic function along either scanning direction, it has been proposed that the varying components of focus potential have a parabolic wave-form in both axes. Prior suggestions for effecting dynamic focusing have adopted the expedient of separate signal generators designed to develop a focusing potential of the requisite wave-form, but for the most part they have been undesirably costly and complicated.

In seeking a more economical solution, the art has learned that a focus potential of sinusoidal wave-form may be a sufficiently close approximation to maintain the focus within practical tolerances. However, prior efforts to arrive at a simplified, as well as satisfactory, solution to the problem have not been successful. One proposal contemplates coupling a resonant circuit across an impedance included in series with the horizontal deflection winding and tuning it to the horizontal scanning frequency. The condition of maximum signal amplitude derived from the resonant circuit, however, is found to occur with the sinusoidal signal in incorrect phase relation with respect to the scanning cycle and the correct phase is obtained only at a sacrifice of much needed signal amplitude.

Other expedients of the prior art feature the inclusion of a signal-generating network in a series with the scanning yoke in order to develop the desired focusing potential, but this approach, especially if employed in the horizontal system, suffers from the distinct possibility of introducing non-linearity in the scanning pattern. Obviously, any modification of the scanning system which impairs linearity is most undesirable.

It is, therefore, an object of the present invention to provide a focusing and scanning system which avoids one or more of the defects of prior art systems.

It is a further object of the invention to provide a focusing and scanning system characterized by the fact that a focusing potential of appropriate wave-form and correct phase is developed by means of a simplified wave-shaping network.

It is a particular object of the invention to provide an improved focusing and scanning system for effecting linear scanning and dynamic focusing in a cathode-ray tube of the electrostatically focused type.

In accordance with the invention, a focusing and scanning system for a cathode-ray type television apparatus comprises a sweep amplifier including an electron discharge device having anode, screen and cathode electrodes. A magnetic scanning yoke is coupled to the anode and cathode, and means are provided for applying a scanning signal to the yoke through the amplifier to effect periodic scanning of a cathode-ray beam in the television apparatus to define trace and retrace intervals. A passive wave-shaping network is coupled to the screen and cathode electrodes and is responsive to the scanning signal to develop a focusing signal synchronized with the scanning. The focusing signal has a wave-form which varies between two limiting values. One limiting value is attained at the midpoint of the trace interval and the other limiting value is attained at the terminal portions of the trace interval. There are means for focusing the cathode-ray beam and further means for applying the focusing signal to the focusing means.

The features of this invention which are believed to be new are set forth with particularity in the appended claims. The invention itself, however, together with further objects and advantages thereof, may best be understood by reference to the following description when taken in conjunction with the accompanying drawing in which:

Figure 1 represents a television receiver including a focusing and scanning system constructed in accordance with the invention;

Figure 2 comprises curves utilized in explaining the operation of the focusing phenomenon; and Figure 3 shows a variation of the dynamic focus arrangement included in the vertical scanning system.

Referring more particularly to Figure 1, the television receiver there illustrated comprises a radio-frequency amplifier 10 of one or more stages having input terminals connected to an antenna circuit 11, 12 and output terminals connected to a first detector or oscillator-modulator 13. The oscillator-modulator is coupled through an intermediate-frequency amplifier 14 of any desired number of stages to a second or video-detector 15 which, in turn, is connected to a video-amplifier 16, of one or more stages. The output terminals of the video-amplifier are connected to input electrodes 17 of a cathode-ray image reproducing device or tube 18. For convenience of illustration, the picture tube has been shown cathode-driven from amplifier 16 although it may just as well be connected for grid drive.

Where the receiver is of the inter-carrier type, which is true of most receivers commercially available today, the inter-carrier component developed in the detecting process of the video detector is translated to the video amplifier and there separated from the image content of the received signal. Accordingly, an audio system 20, which may include a sound detector, appropriate stages of audio amplification and a sound translating device, or loud speaker, is connected to the output terminals of video amplifier 16.

Amplifier 16 is further coupled to a synchronizing-signal separator 21 which is connected to a focusing and scanning system enclosed within the broken-line rectangle 22 and embodying the subject invention. For present purposes, consideration will be given to only certain portions of unit 22 which are conventional in design and construction. In particular, this unit includes a horizontal oscillator 23 having synchronizing input terminals coupled to output terminals of synchronizing-signal separator 21. The output terminals of the horizontal oscillator are coupled to a sweep amplifier or output tube 24, arranged to drive horizontal deflection windings 25, 25 of a magnetic yoke assembly associated in the usual way with picture tube 18. Similarly, unit 22 includes a vertical oscillator 26 having synchronizing input terminals likewise connected to output terminals of separator 21. The vertical oscillator is coupled to its sweep amplifier 27, which energizes the vertical deflection windings 26, 26 of the yoke assembly. The circuitry of the sweep amplifiers will be considered in greater detail hereinafter.

In accordance with conventional practice, an automatic gain control system 19 usually driven from the video amplifier, is provided for controlling the gain of radio-frequency amplifier 10 and intermediate-frequency amplifier 14 to maintain the intensity of the signal input to the second detector 15 within a relatively narrow range of variations, even though the received signal may experience a much broader range of variations. This is represented in the drawing by the AGC bus extending between units 10, 14 and 19.

The receiver, as thus far described, is conventional in character and when it is tuned to a signal intercepted by antenna circuit 11, 12 such signal is amplified in radio frequency amplifier 10 and is heterodyned to the selected intermediate frequency of the receiver in oscillator-modulator 13. The resulting intermediate-frequency signal is amplified in amplifier 14 and detected in video detector 15 to produce a composite video signal. The composite video signal, after amplification in amplifier 16, is applied to input electrodes 17 of cathode-ray tube 18 to control the intensity of the cathode-ray beam produced therein in accordance with the image intelligence. The synchronizing components of the composite video signal are separated from the video information in synchronizing-signal separator 21, the horizontal synchronizing components being used to synchronize the horizontal sweep system including oscillator 23. The field synchronizing components, on the other hand, are used to synchronize vertical oscillator 26 and, as a consequence, the controlled oscillators establish properly timed linear deflection signals in horizontal deflection windings 25, 25 and vertical windings 26, 26. In this manner, the beam of cathode-ray tube 18 is caused to effect periodic scansion of its screen and thus define the usual horizontal and vertical trace and retrace scansion intervals. Concurrent with the scanning, the cathode-ray beam is intensity modulated by the video information and, in this well-known manner, the picture tube is enabled to reproduce on its viewing screen an image representing the picture intelligence conveyed by the televison signal. At the same time, the inter-carrier component representing the sound program accompanying the picture information is fed from video amplifier 16 to audio system 20 in order that the sound accompaniment may be reproduced along with the picture.

More particular consideration will now be given to the circuitry of unit 22, especially that portion thereof which permits the attainment of a focusing potential of appropriate waveform and phase from a combined focusing and scanning system of simplified construction. Specifically, the sweep amplifier or horizontal output tube 24 is of the pentode type having the usual anode, suppressor, screen, control grid and cathode electrodes. The coupling of the output tube to the horizontal oscillator is of the R-C type and comprises a coupling condenser 30 and a grid resistor 31. The horizontal windings 25, 25 of the magnetic scanning yoke are coupled across an autotransformer 32 which is included in the anode-cathode circuit of tube 24, being connected in series relation with a boot-strap condenser 33 to a source of energizing potential indicated B+. This connection constitutes means for applying a scanning signal to the yoke through the horizontal output tube. There is also the usual damper diode 34, and tuning condenser 35 connected across the autotransformer. A high voltage diode 36 is coupled by means of a further winding 37 to the horizontal output tube and its filament voltage is obtained from still another winding 38 of the transformer. The high voltage diode supplies final anode voltage to picture tube 18. This is accomplished by a connection from the cathode through a resistor 39. The complete high voltage connection to the picture tube has not been shown but the points of connection have been identified by the legend "H.V." at both the diode and cathode-ray tube.

In order to derive the required focusing potential to compensate a tendency toward defocusing as the beam of tube 18 scans the screen in a horizontal direction, a passive wave-shaping network is coupled to the screen and cathode electrodes of output tube 24. The wave-shaping network includes inductive and capacitive impedances constituting a series resonant circuit tuned to the fundamental of the line-scanning signal. The principal capacitive component is a small condenser 40, which is connected in series with a variable inductor 41, a variable resistor 42, and a fixed resistor 43, to an adjustable tap on a potentiometer 44 connector to a source of uni-directional potential of B+ and ground. At its opposite terminal, this series circuit connects to the junction of a resistor 49, which is in series with the screen electrode, and a by-pass condenser 45, connecting the screen to the cathode. Energizing potential for the screen is obtained from a source B+ through a dropping resistor 46.

The output tube 27 of the vertical system is a triode and is coupled to the vertical oscillator through a coupling condenser 50 and a grid resistor 51. The primary winding of a sweep transformer 52 is connected between the anode and a source of excitation potential B+ and the vertical deflection windings 26, 26 are connected across the secondary of the transformer. Damping resistors 53, 53 are provided for the vertical windings in the usual way and a condenser 53*a* is connected across the windings to give protection against adverse effect of signals occurring at the horizontal rate. The passive wave-shaping network in the vertical branch of the scanning system provided to compensate for the tendency to defocus during vertical scansion is specifically different from that described in connection with the horizontal system. It is essentially an integrating network comprising a condenser 55 connected in series relation with an inductor 54 and a variable resistor 56 across the deflection windings. A coupling condenser 58 is connected between the junction of integrating condenser 55 and inductor 54 and resistor 43. A connection 59 from the focusing electrode 60 of tube 18 to the junction of condenser 40 and inductor 41 constitutes means for applying a component of uni-directional potential, determined by the position of tap 43, plus components of varying potential from the described wave-shaping networks to the electrode 60 serving as means for focusing the cathode-ray beam of the picture tube.

As the system for establishing linear scanning of the image screen of the picture tube in both the horizontal and vertical directions, the described arrangement is entirely conventional and its operating details, therefore, need not be recited. The operation of the focusing aspect of the described structure is, however, distinctly different from that of the prior art and will be considered on the basis of the theory of superposition in respect of the D.C. component of the focusing potential and two varying components of focusing potential related respectively to the horizontal and vertical functions. The D.C. component is determined primarily by setting of the tap of the potentiometer 44.

One fluctuating component of focusing potential is that developed by series resonant circuit 40, 41. The signal voltage applied by output tube 24 to the magnetic scanning yoke to accomplish linear scanning in the horizontal direction is represented in curve A of Figure 2 and will be recognized as the familiar pulse-sawtooth. The pulse portion of the signal occurs during the retrace time of the horizontal scan, that is, the time during which the beam executes its fly-back excursion. The relatively slower sloped linear portion, which is the sawtooth component, defines the trace interval in which the beam makes its writing excursion across the screen in a horizontal direction. The wave-form of curve A is, of course, that of the signal variation at the anode of the output tube. The screen electrode of the output tube also experiences potential excursions in response to the scanning signal applied to the input circuit and, as a result, a signal of the wave-form of curve B is developed in the wave-shaping network. This may be considered to be the potential variation of the point C of Figure 1 with respect to ground, for the horizontal sweep component.

It is clear from inspection that the signal of curve B has, during trace intervals, two limiting values, and one (the minimum value) is attained at the midpoint of the trace interval. The other (points of maximum value) occurs at the terminal portions of the trace interval. In other words, the signal variation within the trace period is a fair approximation of a parabola. Actually, it is a segment of a sinusoidal signal. The peak positive portions of the sine wave occur during retrace so that, as stated above, the segment within the trace interval is an approximation of a parabola. When the beam is at the midpoint of the scanning raster, there is no need for focusing compensation because the operating potentials of the tube, including the D.C. potential level of focusing electrode 60, establish proper focusing at this part of the raster. As the beam deviates from the center along a horizontal scanning line, however, the need for compensation increases. The amplitude level of the varying component of focusing potential changes in the same sense during that traverse of the beam as required to maintain proper focus, that is, to maintain a substantially constant condition of focus through each line trace.

While circuit 40, 41 is tuned to the horizontal-scanning frequency, its inductive, capacitive, and resistive components are selected to achieve a high "Q" in order that a large signal, measured peak to peak, is available for effecting compensation. It has been found from actual test and observation that the sine wave developed in the described network has both the required peak value and phase relation in respect of the scanning process. Adjustment of its peak amplitude, for example by appropriate setting by variable resistor 42, enables the correct amount of compensation to be realized throughout each scanning line. Amplitude variations of this signal may also be achieved by using a variable condenser for component 45, but if the condenser value is made too small, there will be a tendency to non-linearity in the sweep and that must be avoided.

Not as much compensation or correction is required in the vertical as in the horizontal direction. This will be manifest when it is remembered that the aspect ratio of the picture is 4:3. The focusing signal developed in wave-shaping network 54, 55 is similar to a negative cosine wave having a frequency of 60 cycles and it is essentially an integration of the deflection signal applied to vertical windings 26, 26. It may likewise be adjusted in amplitude by means of the variable resistor 56.

In sum, the potentials established through the described arrangements on the focusing electrode 60 include a D.C. component derived from potentiometer 44, a first variable potential experiencing amplitude excursions at the horizontal rate and still another variable component which undergoes amplitude excursions at the field or vertical rate. The superposition of these potentials on focusing electrode 60 maintains a proper condition of focus as the screen of picture tube 18 is scanned under the influence of the horizontal and vertical windings of the magnetic deflection yoke. If the peak amplitude of the correction signal in the vertical direction is inadequate, it may be increased by replacing inductor 54 by an autotransformer to step up the potential as applied to the focusing electrode.

By way of illustration, and not by way of limitation, the following parameters were successfully employed in obtaining a substantially constant condition of focus over the scanning raster of 14" picture tube through the described focusing and scanning system:

| | | |
|---|---|---|
| Tube **24** | | Type 17DQ6 |
| Tube **27** | | Type 8CN7 |
| Rheostat **42** | ohms | 5,000 |
| Rheostat **56** | do | 20,000 |
| Resistor **43** | megohms | 1 |
| Resistor **44** | do | 7½ |
| Resistor **46** | ohms | 10,000 |
| Resistor **49** | do | 100 |
| Condenser **40** | micromicrofarads | 340 |
| Condenser **45** | microfarads | .0022 |
| Condenser **55** | do | .055 |
| Condenser **48** | do | .1 |
| Inductor **41** | henries | .3 |
| Inductor **54** | do | 130 |
| Potential of tap **43** to ground | volts | 100 |

In practical applications of dynamic focusing, it is necessary to take into consideration the particular characteristics of the scanning yoke because it has been found that yoke structures vary materially and contribute to defocusing. For example, in the illustrative arrangement described above, it was necessary to employ a negative cosine wave for focusing compensation in the vertical direction, whereas the opposite or positive polarity cosine wave would normally be expected. Should the yoke construction require a positive polarity cosine wave, it may, of course, be achieved by effecting a different polarity connection for wave-shaping network 54—56. In other words, this network would then be connected to the primary section of transformer 52. In addition to influencing the polarity requirements of the compensating signal, the characteristics of the deflection yoke may also have a distinct bearing on the amplitude of the correcting signal. The described circuit provides compensating signals of approximately 350 volts R.M.S. in the horizontal direction and 24 volts R.M.S. in the vertical direction. A much larger correcting signal for the vertical may be attained from the arrangement in Figure 3.

In this modification a cosine wave of positive polarity is developed in a resonant network 61, including a condenser and an inductor, tuned to the vertical scanning rate. It is coupled to the anode of the vertical output tube 27 through a unidirectionally conductive device, such as a silicon diode 62 and a R-C network 63, 64. The R-C network has a high impedance and determines the loading on the vertical system. It may, for example, comprise a condenser of 0.33 microfarad and a discharge resistor of 2.2 megohms. In operation, a signal of sinusoidal wave-form, specifically a positive cosine wave, occurring at the vertical rate is developed in tuned circuit 60 for application along with the correcting signal from network 40, 41 to focusing electrode 60. The time constant of network 63, 64 determines the magnitude of the self-bias developed in the circuit of diode 62 and the amplitude of the vertical compensating signal.

It will be appreciated that the instantaneous amplitude of the compensating signals during retrace intervals is of no particular concern because, in accordance with conventional practice, the beam of the picture tube is blocked out during retrace. Blockout signal pulses for that purpose are derived from the sweep system but since the technique is strictly conventional, this circuitry has been omitted in order to simplify the drawing.

In color television receivers employing an image-reproducing device which has three separate cathode-ray beams, there is need for focusing of the same general type considered above and focusing of another type which is referred to as "dynamic convergence." Dynamic convergence has to do with bringing all three beams into focus at particular elemental areas of the scanned structure throughout the scanning raster, even though the distance of such screen areas may vary with respect to the three sources of the beams. The arrangement of this invention for obtaining a compensating focusing potential may likewise be adapted to maintaining proper convergence in such color tubes and, for present purposes, convergence may be likened to focusing.

The invention provides focusing potentials particularly suited for electrostatically focused picture tubes by means of a network of great simplicity. The network is further characterized by the fact that the focusing potential has correct phase and amplitude with respect to the scanning process and has the wave-form required to maintain proper focus throughout the scanning raster.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A focusing and scanning system for a cathode-ray type television apparatus comprising: a sweep amplifier including an electron-discharge device having anode, screen and cathode electrodes; a magnetic scanning yoke coupled to said anode and cathode electrodes; means for applying a scanning signal to said yoke through said amplifier to effect periodic scanning of a cathode-ray beam in said apparatus to define trace and retrace intervals; a passive wave-shaping network coupled to said screen and cathode electrodes and responsive to said scanning signal for developing a focusing signal synchronized with the scanning and having a wave-form which varies between two limiting values, one such value being attained at the mid-point of said trace interval and the other being attained at the terminal parts of said trace interval; means for focusing the cathode-ray beam of said apparatus; and means for applying said focusing signal to said focusing means.

2. A focusing and scanning system for a cathode-ray type television apparatus comprising: a sweep amplifier including an electron-discharge device having anode, screen and cathode electrodes; a magnetic scanning yoke coupled to said anode and cathode electrodes; means for applying a scanning signal to said yoke through said amplifier to effect periodic scanning of a cathode-ray beam in said apparatus to define trace and retrace intervals; a passive wave-shaping network including inductive and capacitive impedances constituting a circuit resonant at the scanning frequency and coupled to said screen and cathode electrodes and responsive to said scanning signal for developing a focusing signal of sinusoid wave-form so phased that the negative polarity peak value thereof occurs substantially at the midpoint of said trace interval; means for focusing the cathode-ray beam of said apparatus; and means for applying said focusing signal to said focusing means.

3. A focusing and scanning system for a television apparatus including a cathode-ray tube of the electrostatically focused type comprising: a sweep amplifier including an electron-discharge device having anode, screen and cathode electrodes; a magnetic scanning yoke coupled to said anode and cathode electrodes; means for applying a scanning signal to said yoke through said amplifier to effect periodic scanning of a cathode-ray beam in said apparatus to define trace and retrace intervals; a passive wave-shaping network including inductive and capacitive impedances constituting a circuit resonant at the scanning frequency and coupled to said screen and cathode electrodes and responsive to said scanning signal for developing a focusing signal of sinusoid wave-form so phased that the negative polarity peak value thereof occurs substantially at the midpoint of said trace interval; a focusing electrode in said cathode-ray tube; and means for applying said focusing signal to said focusing electrode.

4. A focusing and scanning system for a television apparatus including a cathode-ray tube of the electrostatically focused type comprising: a sweep amplifier including an electron-discharge device having anode, screen and cathode electrodes; a magnetic scanning yoke coupled to said anode and cathode electrodes; means for applying a scanning signal to said yoke through said amplifier to effect periodic scanning of a cathode-ray beam in said apparatus to define trace and retrace intervals; a passive wave-shaping network including inductive and capacitive impedances constituting a circuit resonant at the scanning frequency and coupled to said screen and cathode electrodes and responsive to said scanning signal for developing a focusing signal of sinusoid wave-form so phased that the negative polarity peak value thereof occurs substantially at the midpoint of said trace interval; a focusing electrode in said cathode-ray tube; and means for applying a unidirectional potential and said focusing signal to said focusing electrode to control the focus of the beam of said tube throughout said trace interval.

5. A focusing and scanning system for a television apparatus including a cathode-ray tube of the electrostatically focused type comprising: a horizontal sweep amplifier including an electron-discharge device having anode, screen and cathode electrodes; a magnetic scanning yoke including a horizontal deflection winding coupled to said anode and cathode electrodes; means for applying a scanning signal to said yoke through said amplifier to effect periodic horizontal scanning of a cathode-ray beam in said apparatus to define trace and retrace intervals; a passive wave-shaping network including inductive and capacitive impedances constituting a circuit resonant at the scanning frequency and coupled to said screen and cathode electrodes and responsive to said scanning signal for developing a focusing signal of sinusoid wave-form so phased that the negative polarity peak value thereof occurs substantially at the midpoint of said trace interval; a focusing electrode in said cathode-ray tube; and means for applying a unidirectional potential and said focusing signal to said focusing electrode to control the focus of said tube throughout said trace interval.

6. A focusing and scanning system for a television apparatus including a cathode-ray tube of the electrostatically focused type comprising: a horizontal sweep amplifier including an electron-discharge device having anode, screen and cathode electrodes; a horizontal deflection winding coupled to said anode and cathode electrodes; means for applying a scanning signal to said yoke through said amplifier to effect periodic horizontal scanning of a cathode-ray beam in said apparatus to define horizontal trace and retrace intervals; a passive wave-shaping network including inductive and capacitive impedances constituting a circuit resonant at the scanning frequency and coupled to said screen and cathode electrodes and responsive to said scanning signal for developing a focusing signal of sinusoid wave-form so phased that the negative polarity peak value thereof occurs substantially at the midpoint of said horizontal trace interval; a vertical sweep amplifier; a vertical deflection winding driven by said vertical amplifier; means for applying a scanning signal to said vertical amplifier to effect periodic vertical scanning of said cathode-ray beam to define vertical trace and retrace intervals; a passive wave-shaping network including an integrating condenser connected in parallel with said vertical winding for developing a further focusing signal, similar in waveform to said first-mentioned focusing signal; a focusing electrode in said cathode-ray tubes; and means for applying a unidirectional potential and both of said focusing signals to said focusing electrode to control the focus of the beam of said tube throughout said trace intervals.

7. A focusing and scanning system for a television apparatus including a cathode-ray tube of the electrostatically focused type comprising: a sweep amplifier including an electron-discharge device having a cathode and a plurality of output electrodes; a magnetic scanning yoke coupled to said cathode and to one of said output electrodes; means for applying a scanning signal to said yoke through said amplifier to effect periodic scanning of a cathode-ray beam in said apparatus to define trace and retrace intervals; a passive wave-shaping network including inductive and capacitive impedances constituting a circuit resonant at the scanning frequency and coupled to said cathode and to the other of said output electrodes and responsive to said scanning signal for developing a focusing signal of sinusoidal waveform so phased that a peak value thereof occurs substantially at the midpoint of said trace interval; a focusing electrode in said cathode-ray tube; and means for applying said focusing signal to said focusing electrode.

References Cited in the file of this patent

UNITED STATES PATENTS

| | | |
|---|---|---|
| 2,514,079 | Lockhart | July 4, 1950 |
| 2,628,326 | Bridges | Feb. 10, 1953 |